UNITED STATES PATENT OFFICE.

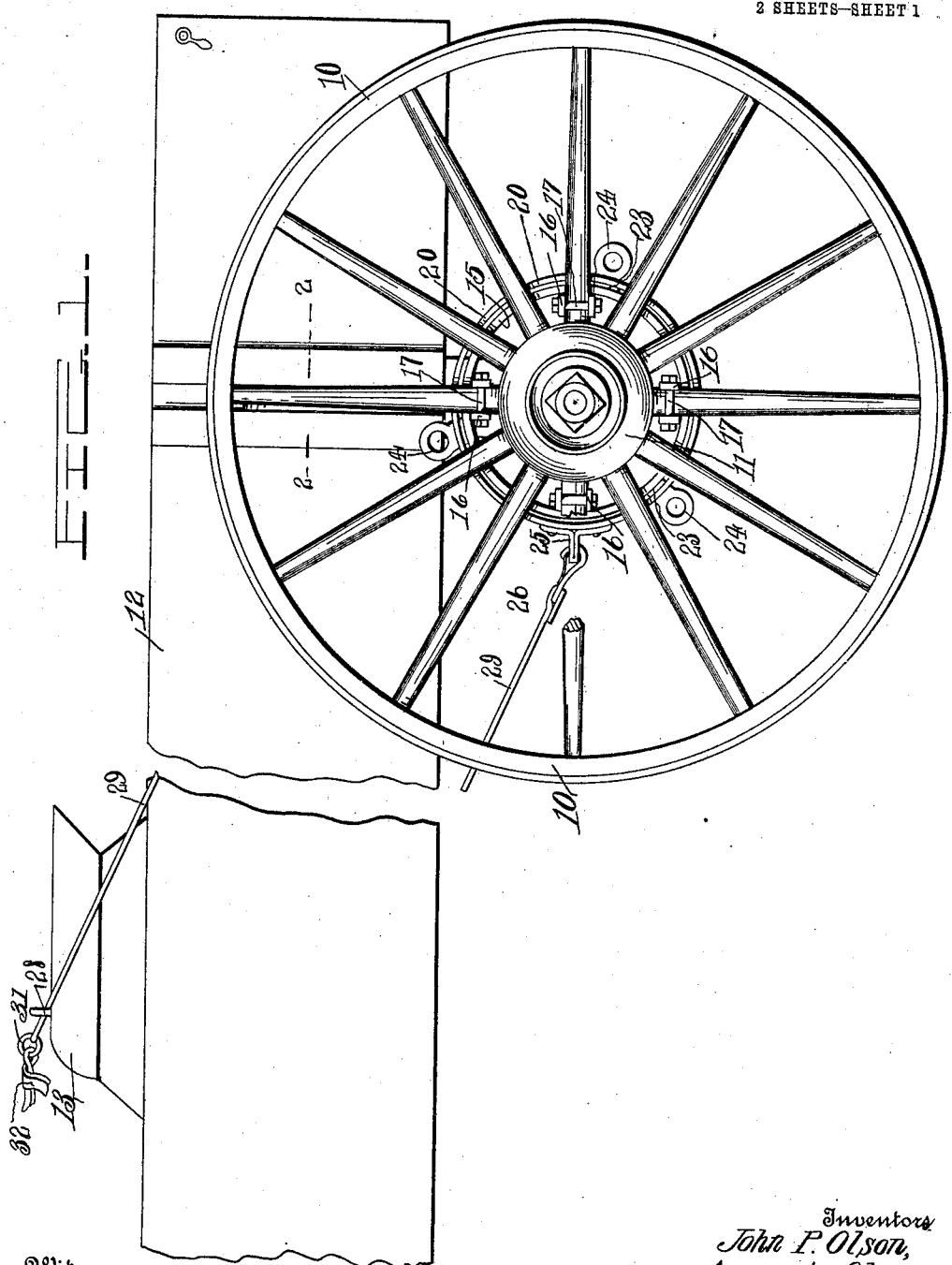

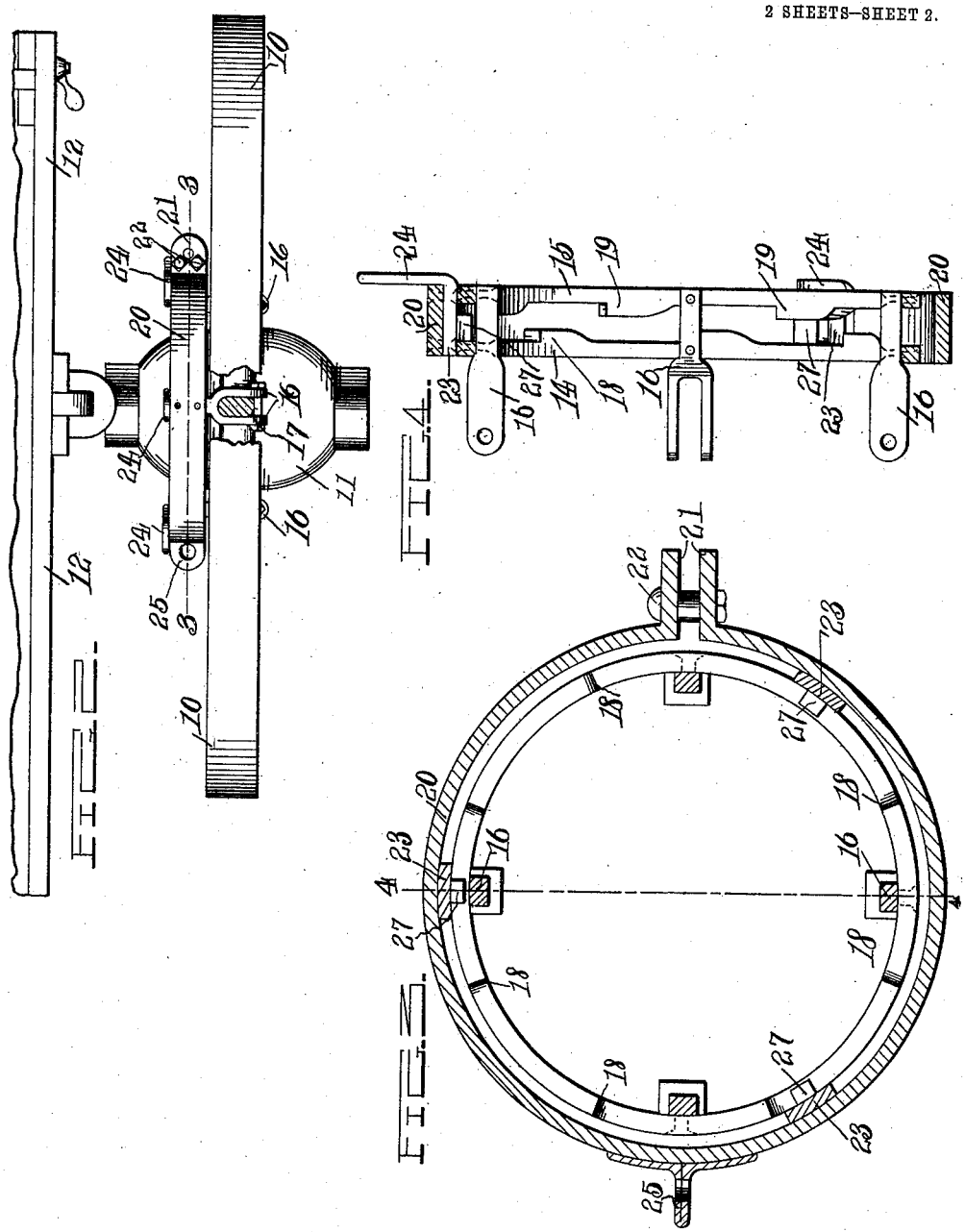

JOHN P. OLSON, AUGUST OLSON, AND CHARLES OLSON, OF GLADSTONE, MICHIGAN.

HORSE-HITCHING DEVICE.

983,397.	Specification of Letters Patent.	Patented Feb. 7, 1911.

Application filed April 11, 1910. Serial No. 554,745.

*To all whom it may concern:*

Be it known that we, JOHN P. OLSON, AUGUST OLSON, and CHARLES OLSON, citizens of the United States, residing at Gladstone, in the county of Delta, State of Michigan, have invented certain new and useful Improvements in Horse-Hitching Devices; and we do hereby declare the following to be a full, clear, and exact description of the invention, such as will enable others skilled in the art to which it appertains to make and use the same.

This invention relates to horse hitching devices, more particularly to devices of this character connected to one of the rear wheels of a vehicle, and has for one of its objects to improve the construction and increase the efficiency and utility of devices of this character.

Another object of the invention is to provide a device of this character wherein provision is made for causing a strain to be applied to the driving reins in event of the horse attempting to move forwardly, but which will not prevent the ready backing of the horse.

Another object of the invention is to provide a device of this character which may be readily applied to vehicles of various sizes without material structural changes either in the wheel or in the attachment.

With these and other objects in view, the invention consists in certain novel features of construction as hereinafter shown and described and then specifically pointed out in the claims; and, in the drawings illustrative of the preferred embodiment of the invention, Figure 1 is a side elevation of a portion of a vehicle including a portion of the body and one of the rear wheels with the attachment applied, Fig. 2 is a plan view of the parts shown in Fig. 1 with a portion of a wheel broken away with one of the spokes in section on the line 2—2 of Fig. 1, Fig. 3 is a section of the improved device detached and in section on the line 3—3 of Fig. 2, Fig. 4 is a view of the device detached and in section on the line 4—4 of Fig. 3.

The improved device is designed to be applied to one of the rear wheels of a vehicle, and may be applied to the left or right hand wheel as preferred, but for the purpose of illustration is shown applied to the left hand rear wheel, and in the drawings the wheel is represented conventionally at 10 having a hub 11, the vehicle body or box at 12, and the drivers' seat at 13, these parts being of the usual construction.

The improved device is designed to be attached to the spokes of the wheel and concentric to the hub, and comprises an inner annular portion connected to the spokes of the wheel and an outer annular portion rotatable upon the inner portion. The inner portion is formed of two rings 14—15 each provided with a plurality of clips 16 riveted or otherwise rigidly secured thereto at spaced intervals, the clips being forked to bear upon the opposite sides of the spokes and secured in position by transverse bolts 17.

The device is preferably located inside of the wheel, as shown, or between the wheel and the body 12. The ring 14 is provided with a plurality of inwardly directed ratchet teeth 18, while the ring 15 is provided with a corresponding number of ratchet teeth 19, the teeth 19 of the ring 15 being located opposite the spaces between the teeth 18 of the ring 14, as represented in Fig. 4, the object to be hereinafter explained.

The outer annular portion comprises a band 20 having outturned terminals 21 coupled by a clamp bolt 22 or other suitable fastening device, and is equal in width to the combined widths of the rings 14—15, as shown in Fig. 4. At suitable intervals the band 20 is supplied with transverse spacer members 23 riveted or otherwise secured to the band and bearing upon the rings 14—15, and thus maintaining the band spaced from the rings and rotatable thereon. Each of the spacer members 23 is provided with an outwardly extending arm 24, preferably perforated, and forming guards to the hitching strap to prevent its displacement from the band 20, as hereinafter explained.

At one point upon its periphery, preferably opposite the outturned terminals 21, the band 20 is provided with an outwardly directed perforated lug 25 into which a snap 26 or other suitable fastening device is connected to enable the hitching strap to be coupled to and uncoupled from the band when the horse is to be hitched.

Each of the members 23 is provided with an inwardly directed lug 27, which operates within the space between the rings 14—15 and is alternately engaged with the teeth 18—19, to provide coupling means between the band 20 and the rings when the rings are moved in one direction, but which will permit the band 20 to freely move around the rings when the rings are moved in the opposite direction. As before stated the rings 14—15 are coupled to the wheel 10 and partake of its rotary motion, while the band 20 is free to rotate over the rings, when the wheel is moved in one direction, but will be "picked up" by the engagement of the lugs 27 with the teeth 18—19 when the wheel is rotated in the opposite direction, the band 20 with its spacers 23 being movable laterally upon the rings to permit the lugs 27 to alternately engage with the ratchet teeth. Attached to the seat 13 is a ring or other suitable guide device 28, and operating through this ring is a strap or a section of cable or other flexible material 29 which is provided at its free end with the snap 26. The forward end of the member 29 is provided with a ring 31 to which the driving reins, portions of which are shown at 32, are adapted to be engaged when the horse is to be hitched.

With a device thus constructed the operation is as follows. When the driver wishes to hitch his team he attaches the driving reins to the ring 31 and engages the snap 26 in the perforated lug 25, care being taken that the driving reins 32 and the strap 29 are relatively tight, but not tight enough to annoy the team. So long as the team remains quiet the improved device remains inoperative, but if the team moves forwardly or attempts to run away, the forward movement of the wheel 10 thus produced will cause the rotating rings 14—15 to pick up the band 20 by the engagement of the lugs 27 with the teeth 18—19, and thus wind the strap 29 around the band 20 as a drum, and apply a backward-pulling force upon the driving reins, and stop the forward movement of the team.

It will be seen that by the use of the opposed ratchets I am able to dispense with all springs, pawls and the like. In the present construction there is only one moving element, the band 20, which as shown is of a very substantial construction and indefinitely long efficient life. It may also be pointed out that the ratchet device employed in my attachment is not dependent upon a spring or upon the force of gravity for its action, the lugs 27 and the slotted band periphery with the teeth formed therein coacting by virtue of the inertia of the band 20. Excessive friction or wear of the parts will make the action of the locking device still more positive.

The improved device is simple in construction, can be inexpensively manufactured and applied without material structural changes to vehicle wheels of various sizes and forms, and operates effectually for the purposes described.

The improved device may be applied either outside the wheels or between the wheels and the body, but for the purpose of illustration is shown applied between the body and the left hand wheel, but the improved device may be applied without change upon the outside of the left hand wheel. By simply reversing the positions of the members 23—24 and the members 16 the device may be applied to either the outside or the inside of either rear wheel, but this would not constitute a departure from the principle of the invention, as this requires no structural change in the device.

What is claimed is:—

1. A device of the class described comprising an annular member for attachment to a vehicle wheel and formed with an encircling channel having a plurality of ratchet teeth in the conforming sides thereof, the teeth at one side being located opposite the spaces between the teeth of the other side, a band mounted for rotation upon said annular member and provided with a plurality of inwardly directed lugs projecting into the channel of the annular member and engaging alternately with said ratchet teeth, and means for coupling the driving reins of a team to said band.

2. A device of the class described comprising an annular member for attachment to a vehicle wheel and formed with an encircling channel having a plurality of inwardly directed ratchet teeth alternately arranged, a band mounted for rotation upon said annular member, a plurality of spacer members connected to said band and bearing against the annular member, each spacer member having an inwardly directed lug engaging in the channel of the annular member, and means for coupling the driving reins of a team to said band in position to be wound around the band.

3. A device of the class described comprising an annular member for attachment to a vehicle wheel and formed with an encircling channel having a plurality of inwardly directed ratchet teeth alternately arranged, a band mounted for rotation upon said annular member, a plurality of spacer members connected to said band and bearing against the annular member, each spacer member having an outwardly directed strap guard and an inwardly directed lug, and means for coupling the driving reins of a team to said band in position to be wound around the band and retained in position by the strap guards.

4. A device of the class described comprising an annular member formed of two rings spaced apart and with ratchet teeth in their confronting edges the teeth of one band being located opposite the spaces between the teeth of the other band, a plurality of clips coupling said rings and adapted to be secured to a wagon wheel, a band mounted for rotation upon said annular member and provided with a plurality of inwardly directed lugs projecting into the space between the bands and engaging alternately with said ratchet teeth, and means for coupling the driving reins of a team to said band in position to be wound around the band.

In testimony whereof, we affix our signatures, in presence of two witnesses.

JOHN P. OLSON.
AUGUST OLSON.
CHARLES OLSON.

Witnesses:
FREDERICK HUBER,
WILLIAM J. GAGNON.